UNITED STATES PATENT OFFICE.

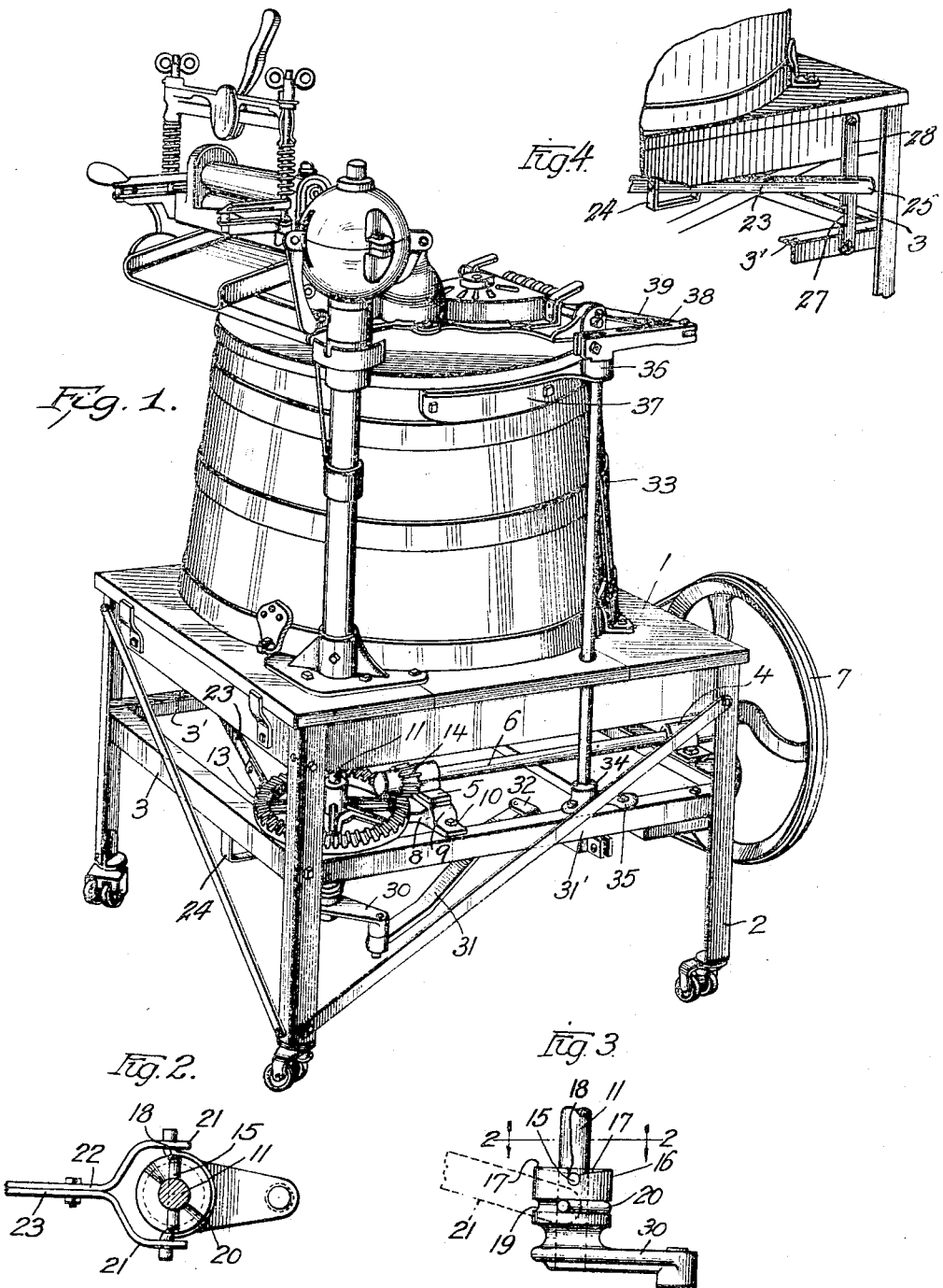

WILLIAM H. VOSS, OF DAVENPORT, IOWA.

WASHING-MACHINE GEARING.

1,294,325.  Specification of Letters Patent.  Patented Feb. 11, 1919.

Original application filed November 10, 1915, Serial No. 60,630. Divided and this application filed May 18, 1917. Serial No. 169,378.

*To all whom it may concern:*

Be it known that I, WILLIAM H. VOSS, a citizen of the United States, residing at Davenport, in the county of Scott and State of Iowa, have invented certain new and useful Improvements in Washing-Machine Gearing, of which the following is the specification.

This invention relates to gearing, and particularly to gearing applicable to washing machines and the like.

It is an object of the invention to provide a washing machine having a novel form of drive for the dolly and a construction in which most of the operating mechanism therefor is down under the platform which supports the tub, and out of the way. Further objects and advantages of the invention will appear as the description to follow proceeds.

This application is a division of my copending application, Serial No. 60,630, filed November 10, 1915.

In the drawings:

Figure 1 is a perspective view of the complete machine.

Fig. 2 is a detail sectional plan view of the clutch construction.

Fig. 3 is a detail elevation of the clutch.

Fig. 4 is a detail perspective view showing the operating handle.

1 represents a platform provided with a wooden top, and channeled iron legs 2 suitably braced. A supplementary platform is provided comprising angle irons 3 and 3' firmly bolted to the legs 2. Upon one of the angle irons 3 is mounted a bearing 4 alined with which is a bearing 5, the bearings 4 and 5 supporting the main drive shaft 6 of the machine, which is provided with belt wheel 7. The bearing 5 is supported upon the upraised inner end of a shelf 8 which at one end is bolted to one of the angle irons 3 and at its other end is provided with an upraised portion 9 having a lug 10 bolted to one of the angle irons 3'. The shelf 8 is provided with a vertical bearing in which is mounted the vertical shaft 11 which at its upper end is connected to drive the wringer in a fashion hereinafter to be described. Supported upon the vertical bearing of the shelf 8 and secured to the shaft 11 is a beveled crown gear 13 in mesh with a pinion 14 upon the drive shaft 6. Adjacent its lower end the shaft 11 is provided with a transverse pin 15 (see Figs. 2 and 3) below which is sleeved upon the shaft 11 a clutch 16 having upper cam faces 17 terminating in a slot 18. The clutch 16 is provided with a peripheral groove 19 in which is engaged the bent link 20 joining the ends 21 of a fork 22 upon the end of an arm 23, which is pivoted in the frame upon a special depending bracket 24, and terminates at its other end in a handle 25 engageable in either of the two notches 27 in the strip 28 secured to the support. By this means the clutch 16 may be raised or lowered to engage or disengage the pin 15 with the slot 18. Upon the lower end of the clutch 16 is a crank arm 30 with which is pivotally connected the bent link 31 which at its other end is pivotally connected with the crank arm 32 mounted upon the lower end of a shaft 33 mounted in a bearing 34 secured to a bracket 35 mounted upon one of the angle irons 3'. Shaft 33 at its upper end is mounted in a bearing 36 extended into a curved flange 37 secured to the tub and the shaft 33 is provided at its upper end with a crank arm 38, which is pivotally connected to a curved link 39, in turn connected at its forward end to a suitable rack, for driving the dolly as explained in the parent application referred to.

In operation it will be seen that the belt pulley 7 drives the shaft 6 which drives the bevel crown gear 13 and, therefore, the vertical shaft 11, which drives the wringer and is connected thereto by a clutch so that the wringer can be operated or not as desired. The specific construction of the wringer and this operating mechanism forms no part of the present invention. By operating the clutch 16 through the handle 23 the shaft 33 may be rocked or not, as desired.

Having now described my invention, I claim:—

1. In a washing machine, a support, a rotary shaft thereunder, a vertical oscillatory shaft, means for operating said oscillatory shaft from said rotary shaft, comprising a crank arm movable longitudinally of said rotary shaft and having a clutch device on one face, and a coöperative clutch device on said rotary shaft, and means to move said crank arm into operative and inoperative position with respect to said rotary shaft.

2. In a washing machine, a support having a rotary shaft thereunder and a vertical oscillatory shaft thereon, said rotary shaft having a fixed pin and slidable sleeve thereon, said sleeve having an inclined face and a recess at the bottom thereof to receive said pin, and a crank associated with said sleeve and operatively connected to said vertical shaft to oscillate the same, and means to move said sleeve.

3. In apparatus of the class described, a support, a rotary shaft thereunder, a vertical oscillating driving shaft therein, a crank for oscillating said oscillating shaft, and means for engaging or disengaging the hub of said crank with said rotary shaft.

4. In apparatus of the class described, a support, a vertical driven shaft therein, driving device under the support for driving said driven shaft, a crank mounted on said shaft and adapted to be engaged or disengaged with relation thereto, a second vertical shaft adapted to oscillate on the support, a crank on the second shaft and a link connection under the support between the two cranks.

In witness whereof I hereunto subscribe my name to this specification in the presence of two witnesses.

WILLIAM H. VOSS.

Witnesses:
WILLIAM E. PULS,
ERNST WILCKENS.